US012162430B2

(12) United States Patent
Ciocchetta et al.

(10) Patent No.: US 12,162,430 B2
(45) Date of Patent: Dec. 10, 2024

(54) METHOD FOR UNLOCKING AN OPENING ELEMENT OF A MOTOR VEHICLE AND ASSOCIATED UNLOCKING DEVICE

(71) Applicant: VITESCO TECHNOLOGIES GMBH, Regensburg (DE)

(72) Inventors: Michele Ciocchetta, Toulouse (FR); Alain Fontanet, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 108 days.

(21) Appl. No.: 18/011,142

(22) PCT Filed: Jun. 18, 2021

(86) PCT No.: PCT/EP2021/066625
§ 371 (c)(1),
(2) Date: Dec. 16, 2022

(87) PCT Pub. No.: WO2022/012858
PCT Pub. Date: Jan. 20, 2022

(65) Prior Publication Data
US 2023/0174013 A1 Jun. 8, 2023

(30) Foreign Application Priority Data
Jul. 16, 2020 (FR) ..................... 2007441

(51) Int. Cl.
*B60R 25/24* (2013.01)
*B60R 25/20* (2013.01)
(Continued)

(52) U.S. Cl.
CPC .......... *B60R 25/2045* (2013.01); *B60R 25/24* (2013.01); *E05B 81/08* (2013.01); *E05B 81/77* (2013.01); *E05B 81/78* (2013.01)

(58) Field of Classification Search
CPC . B60R 25/2045; B60R 25/24; B60R 16/0231; E05B 81/08; E05B 81/77; E05B 81/78; E05B 81/90; E05B 79/06
See application file for complete search history.

(56) References Cited

U.S. PATENT DOCUMENTS 9,696,839 B1 7/2017 Bingle et al.
2007/0126243 A1* 6/2007 Papanikolaou ......... E05B 81/25
292/201

(Continued)

FOREIGN PATENT DOCUMENTS

| FR | 3 058 751 | 5/2018 |
| WO | 2017/019760 | 2/2017 |
| WO | 2018/229395 | 12/2018 |

OTHER PUBLICATIONS

International Search Report for PCT/EP2021/066625 dated Sep. 13, 2021, 6 pages.
(Continued)

*Primary Examiner* — Vernal U Brown
(74) *Attorney, Agent, or Firm* — NIXON & VANDERHYE

(57) ABSTRACT

A device for "hands-free" unlocking/locking of a door of a motor vehicle includes a radiofrequency antenna and radiofrequency transmission/reception system to authenticate portable equipment of a user, at least one capacitive sensor to detect the approach and/or the contact of a member of the user in a predetermined zone, an electronic unit controlling the unlocking of the door, an emergency access device, and a chain. The emergency access device includes a body, a graspable pull member connected to a lock actuator and movable between retracted and deployed positions, a retention pin sliding transverse to the pull member, an electric ejector configured to control the sliding of the retention pin, and a control unit for the electric ejector adapted to control (Continued)

the electric ejector in two modes, the control unit controlling the electric ejector in vibration mode as a function of an authentication status of the equipment of the user.

20 Claims, 5 Drawing Sheets

(51) Int. Cl.
  *E05B 81/08* (2014.01)
  *E05B 81/76* (2014.01)
  *E05B 81/78* (2014.01)

(56) References Cited

U.S. PATENT DOCUMENTS

| | | |
|---|---|---|
| 2013/0130674 A1 | 5/2013 | De Wind et al. |
| 2014/0265373 A1* | 9/2014 | Patel .................. E05B 85/16 292/336.3 |
| 2014/0338409 A1 | 11/2014 | Kraus et al. |
| 2020/0011096 A1 | 1/2020 | Leonardi et al. |

OTHER PUBLICATIONS

Written Opinion of the ISA for PCT/EP2021/066625 dated Sep. 13, 2021, 6 pages.

\* cited by examiner

[Fig. 1]
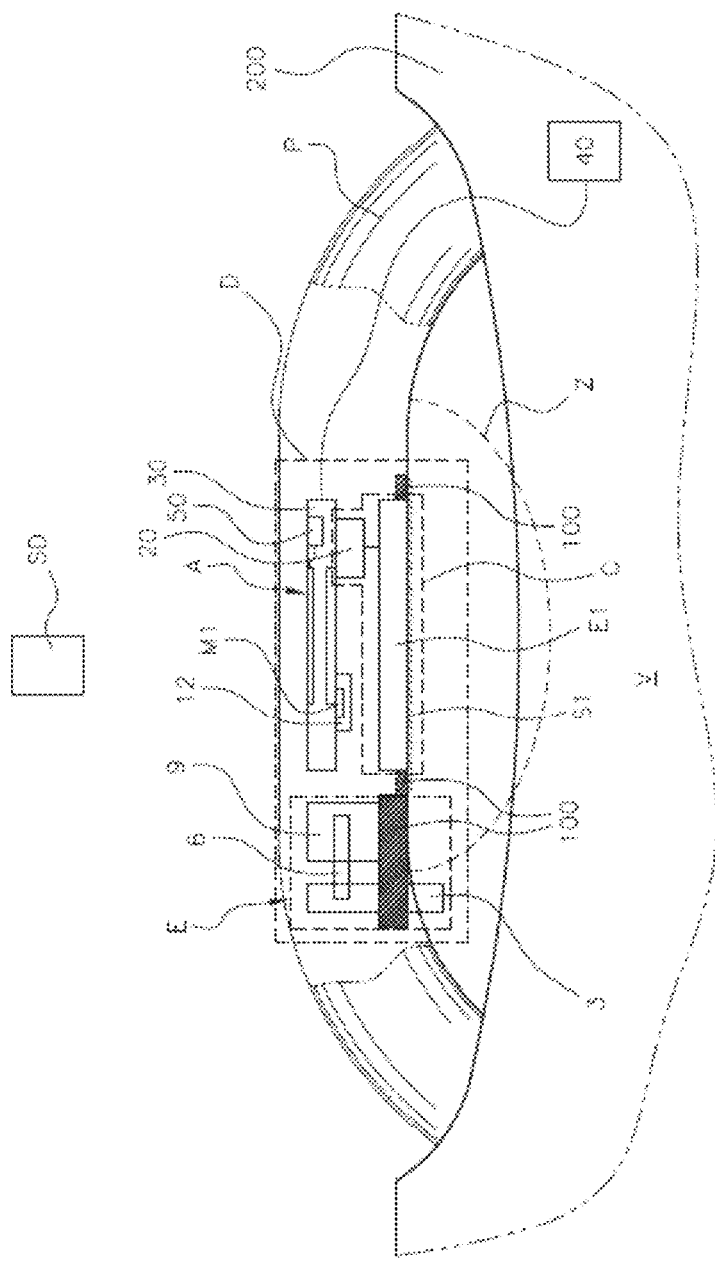

[Fig. 2]
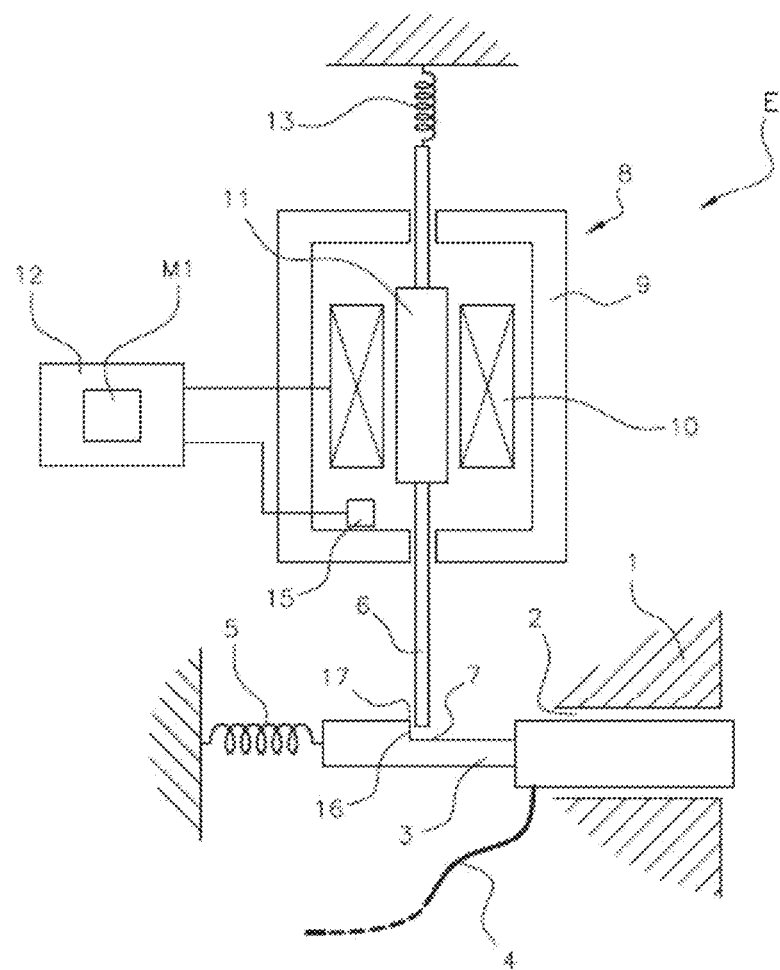

[Fig. 3]
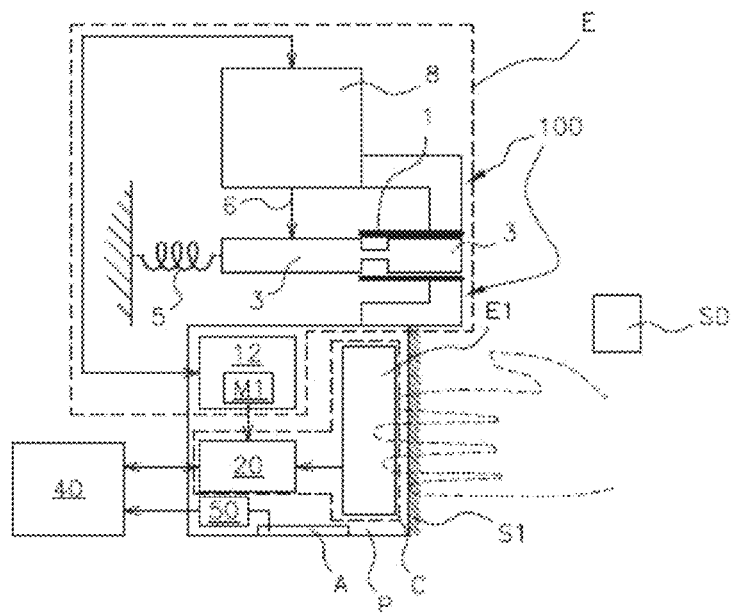
[Fig. 4]
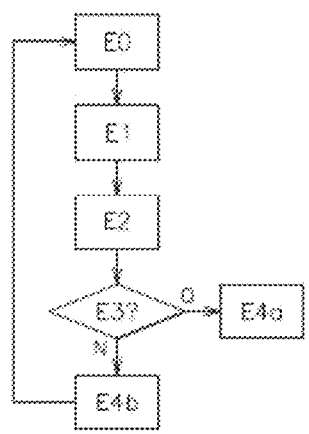

[Fig. 5a]
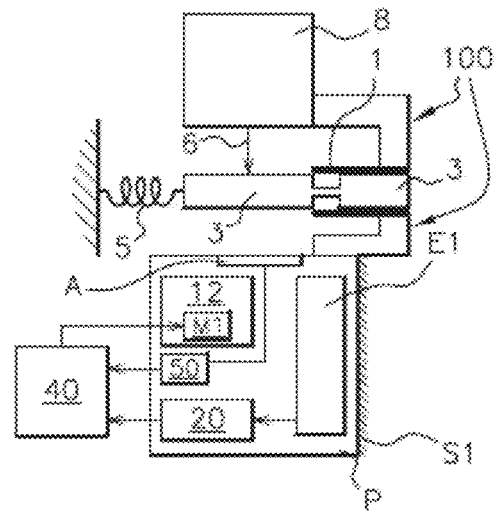
[Fig. 5b]
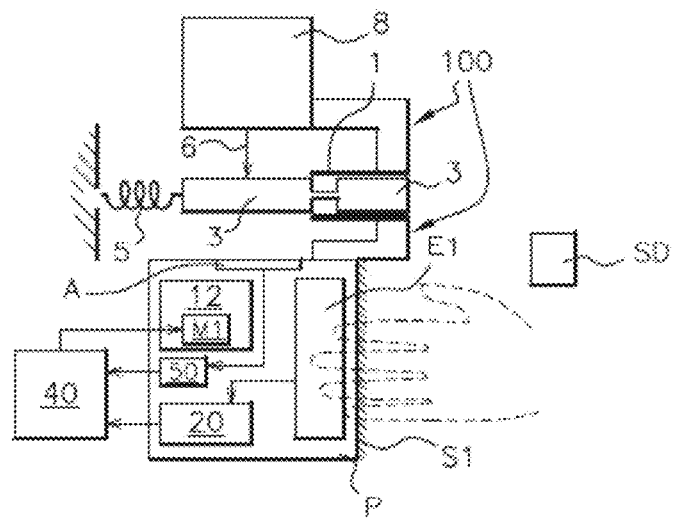

[Fig. 5c]
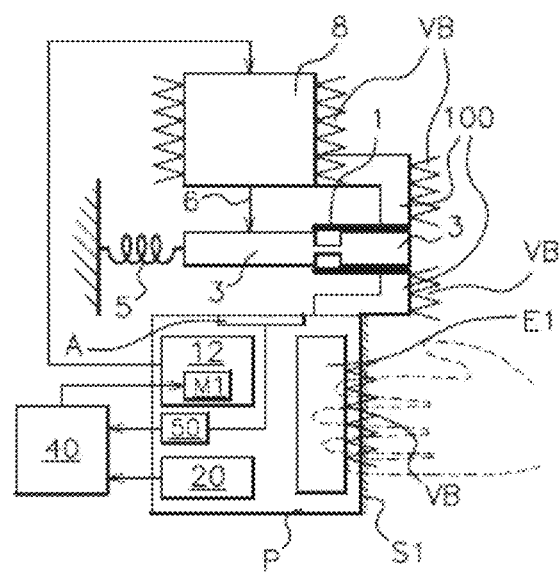

METHOD FOR UNLOCKING AN OPENING ELEMENT OF A MOTOR VEHICLE AND ASSOCIATED UNLOCKING DEVICE

BACKGROUND OF THE INVENTION

Field of the Invention

The invention relates to a method for "hands-free" unlocking of a door of a motor vehicle and an associated unlocking device.

Description of the Related Art

At present, door handles of vehicles are equipped with devices for locking or unlocking a door. Detecting the approach and/or the contact of a member of the user, for example, a hand of the user on the handle, coupled with the recognition of the portable equipment of a user, for example, an electronic "hands-free" remote access control fob, carried by this user, allows the doors of the vehicle to be locked and unlocked. Thus, when the user, carrying the corresponding electronic fob and identified by the vehicle, wishes to unlock the vehicle, they touch the door handle of the vehicle, which then activates an electric striker on the lock of the one or more door(s) of the vehicle that is/are then automatically unlocked. By approaching or pressing a specific location on the door handle of the vehicle, called "unlocking zone", the door (or alternatively all the doors) is (are) unlocked without any further action by the user. Conversely, when the user, still carrying the necessary fob and identified by the vehicle, wishes to lock their vehicle, they close the door of their vehicle and momentarily press another specific location on the handle, called "locking zone". This action automatically locks the doors of the vehicle.

These unlocking/locking devices generally comprise two capacitive sensors, in the form of two electrodes electrically connected to a printed circuit, each integrated into the door handle in a specific locking or unlocking zone. In general, one electrode is dedicated to each zone, i.e., one electrode is dedicated to detecting the approach and/or the contact of the hand of the user in the locking zone and one electrode is dedicated to detecting the approach and/or the contact of the hand of the user in the unlocking zone.

The unlocking/locking device further comprises a radiofrequency antenna, in general LF (Low Frequency), but this antenna also can be a high or ultra-high frequency antenna, of the UWB, BLE, Wi-Fi, 4G, 5G, etc., type. The unlocking/locking device also comprises a vehicle electronic control unit (ECU), which receives a presence detection signal originating from the capacitive sensors. The ECU of the vehicle has previously identified the user as being authorized to access this vehicle, or alternatively, following the reception of this presence detection signal, it carries out this identification. To this end, it sends an identification request to the fob (or to the remote control) carried by the user by way of the radiofrequency antenna. In response, this fob sends its identification code to the ECU of the vehicle via RF (radiofrequency) waves or by UWB, or Wi-Fi, or BLE, etc. If the ECU recognizes the identification code as being the one authorizing access to the vehicle, it triggers the locking/unlocking of the door (or of all the opening elements). If, on the other hand, the ECU has not received any identification code or if the received identification code is erroneous, locking or unlocking is not performed.

Such vehicles are therefore equipped with door handles comprising an unlocking/locking device itself comprising a radiofrequency antenna and two electrodes connected to a microcontroller, integrated in a printed circuit and supplied with voltage, and an ECU connected to the door locking/unlocking system.

However, this locking/unlocking device of the prior art has several major disadvantages.

In this case, in the event of failure to identify the fob or the remote control carried by the user, i.e., without authentication, the door does not unlock, and the user is faced with a door that is blocked in its locked position, without having any information concerning the reason for this blocking.

The user therefore needs to receive information concerning at least the authentication status. On most remote controls or fobs, visual feedback cannot be contemplated because these devices do not have a screen.

A second disadvantage of this type of device is the electrical link between the detection of the presence of the hand by the sensor and the unlocking of the door. These unlocking/locking devices without a mechanical link between the handle and the door lock enable a reduction in weight, size and cost, as well as better operating comfort since no physical or mechanical link is necessary with the lock, in normal operation. However, for safety reasons in particular, these unlocking/locking devices nevertheless require an emergency access device that provides a mechanical link with the door lock in the event of an emergency. In the event of an accident, the door handle or lock can be blocked, the door must be able to be unlocked in order to free the passengers in the vehicle, for example.

The invention proposes an unlocking/locking device allowing:

a. haptic feedback, i.e., sensory feedback to the user allowing them to know whether the authentication has succeeded or failed or whether another cause is the reason for the door being blocked in its locked position;

b. mechanical unlocking of the door in case of emergency.

SUMMARY OF THE INVENTION

The invention relates to a device for "hands-free" unlocking/locking of a door of a motor vehicle, said device being intended to be placed on board said vehicle, and comprising a radiofrequency antenna and radiofrequency transmission/reception means capable of authenticating portable equipment of a user, at least one capacitive sensor for detecting the approach and/or the contact of a member of the user in a predetermined zone, an electronic unit controlling the unlocking of the door, said device being characterized in that it further comprises an emergency access device comprising:

a. a body;

b. a graspable pull member connected to a lock actuator and movable between: a retracted position, in which the pull member is retracted in the body; and a deployed position, in which the pull member projects outside the body;

c. a retention pin sliding transverse to the pull member and adapted to assume: a blocking position, in which it is disposed against the pull member, keeping the pull member in its retracted position; a position for releasing the pull member;

d. an electric ejector adapted to control the sliding of the retention pin;

e. a control unit for the electric ejector adapted to control the electric ejector in two modes: an unblocking mode, in which the electric ejector drives the retention pin from its blocking position to its release position; and a vibration mode, in which the electric ejector oscillates the retention pin between its blocking position and an intermediate position between the blocking position and the release position, the control unit controlling the electric ejector in vibration mode as a function of an authentication status of the equipment of the user, the device comprising a chain for transferring vibrations between the electric ejector and a contact surface of the member of the user, in order to notify the user of the authentication status.

Preferably, the retention pin comprises a ferromagnetic core, and the electric ejector is an electromagnet comprising:
   a. a magnetic circuit surrounding the ferromagnetic core of the retention pin;
   b. a coil adapted to magnetize the magnetic circuit and attract the ferromagnetic core of the retention pin.

Advantageously, the device comprises a blocking spring urging the retention pin toward its blocking position.

The device can comprise an ejection spring urging the pull member toward its deployed position.

The invention also applies to any motor vehicle door handle or any motor vehicle, comprising a device according to any of the aforementioned features.

The invention also relates to a method for "hands-free" unlocking of a door of a motor vehicle by a device according to any of the aforementioned features, characterized in that it comprises the following steps:
   a. detecting the approach and/or the contact of the hand of the user in the predetermined zone;
   b. requesting authentication sent to the portable equipment (SD) of the user;
   c. activating the vibration mode of the electromagnet, with a vibration pattern that is dependent on the authentication status.

Preferably, the oscillation frequency of the retention pin in vibration mode is in the range of 5 to 50 kHz.

Advantageously, the oscillation frequency of the retention pin in vibration mode is substantially equal to the resonant frequency of the pull member.

The oscillation frequency of the retention pin in vibration mode can be a frequency having a regular variation in a predetermined frequency range.

BRIEF DESCRIPTION OF THE DRAWINGS

Further features and advantages of the invention will become more clearly apparent from the following description. This description is purely illustrative and should be read in conjunction with the appended drawings, in which:

FIG. 1 schematically shows a vehicle door handle comprising the unlocking/locking device according to the invention;

FIG. 2 schematically shows an emergency access device of the unlocking/locking device according to the invention;

FIG. 3 schematically shows the unlocking/locking device according to the invention;

FIG. 4 is a flow chart showing the unlocking/locking method according to the invention;

FIG. 5a schematically shows the unlocking/locking device according to the invention at rest;

FIG. 5b schematically shows the unlocking/locking device according to the invention as the hand of the user approaches;

FIG. 5c schematically shows the unlocking/locking device according to the invention during a failed authentication.

DESCRIPTION OF THE PREFERRED EMBODIMENTS

The device D for "hands-free" unlocking/locking of an opening, for example, a door of a motor vehicle, from portable equipment SD of a user according to the invention is shown in FIGS. 1, 3, 5a, 5b, 5c.

The unlocking/locking device D is, for example, but in a non-limiting manner, included in a door 200 handle P of a vehicle V. Said device D also could be included in a door 200 post and/or some elements of the device D can be located in the handle, while others can be located in the door post.

More specifically, this relates to a device adapted to detect the approach of a hand of a user in a predetermined unlocking zone Z located between the handle P and the door 200 and/or also the contact of a hand on a bearing surface S1 of the handle 100 of the vehicle V (see FIG. 1). This bearing surface S1 is located in the vicinity of the electrode E1.

As shown in FIG. 1, the unlocking/locking device D for a door 200 of a vehicle V comprises at least one radiofrequency antenna A, either low frequency or ultra-high frequency, of the Ultra Wide Band, Wi-Fi, 4G, 5G, Blue Tooth or Blue Tooth Low Energy® type, and means 50 for transmitting/receiving radiofrequency signals, connected to said antenna A, and a capacitive sensor C comprising:
   a. an electrode E1, capable of detecting the approach of part of the human body in the predetermined zone Z around the handle P and/or the contact of the hand on the bearing surface S1;
   b. means 20 for controlling said sensor, generating an approach and/or contact detection signal, in the form, for example, of a microcontroller and of software means, integrated in a printed circuit 30.

The control means 20 and the transmission/reception means 50 are connected to an electronic unit 40 (see FIGS. 1, 3, 5a, 5b, 5c) of the BCM (Body Control Module) type, which manages and controls the unlocking of the doors upon reception of:
   a. an approach and/or contact detection signal confirmed and sent by the control means 20;
   b. a successful authentication of the portable equipment SD from an identifier received by the antenna A and sent to the electronic unit 40 by the transmission/reception means 50.

This type of unlocking/locking device is known to a person skilled in the art and will not be described in further detail herein.

According to the invention, the device D also comprises an emergency access device E, shown in detail in FIG. 2.

The schematic view of FIG. 2 shows the main elements of an emergency access device E for a vehicle door. This device E comprises a body 1 forming a frame supporting the various elements of the device. The body 1 is partially shown in FIG. 2. The body 1 comprises a recess 2, in which a pull member 3 is disposed.

The pull member 3 is a graspable element intended to be grasped by the user in the event of activation of the emergency access device. The pull member 3 is connected to a lock actuator that, in the present example, is made up of a cable 4.

The emergency access device E is designed, in this example, to be installed in a vehicle handle P, which has no mechanical connection to the lock, with the whole being mounted on a door 200 of a motor vehicle. However, the cable 4 of the pull member 3 is mechanically connected to the lock and allows this lock to be activated by pulling on the pull member 3 when said pull member is in the deployed position following the activation of the emergency access device E.

The pull member 3 is thus movable between a position retracted in the body 1 (position shown in FIG. 2) and a deployed position, in which the pull member is outside the housing 2, and is disposed outside the body 1.

In the retracted position, the pull member 3 is pressed against an ejection spring 5 that urges the pull member 3 toward its deployed position.

The pull member 3 is kept in the retracted position by compressing the ejection spring 5, by virtue of a retention pin 6 engaged in a groove 7. The pin 6 is adapted to assume a blocking position, in which its end is disposed in the groove 7, against a shoulder 16 of the pull member 3, keeping the pull member 3 in its retracted position (position shown in FIG. 2). The pin 6 is able to slide vertically (in the orientation illustrated in FIG. 2) and is also adapted to assume a position for releasing the pull member, in which the pin 6 is lifted and its end is set back from the groove 7 such that the pull member 3 transitions to its deployed position under the action of the ejection spring 5.

The emergency access device E also comprises an electric ejector adapted to control the sliding of the retention pin 6. The electric ejector in this case is made up of an electromagnet 8 comprising: a magnetic circuit 9 that is produced, for example, by an assembly of laminations; a coil 10 adapted to magnetize the magnetic circuit 9; and a ferromagnetic core 11 fastened to the pin 6. The electromagnet 8 is connected to a control unit 12 that controls the power supply to the coil.

Optionally, the electromagnet 8 can comprise a position sensor 15, which is also connected to the control unit 12, adapted to detect the presence of the pin 6 in its blocking position or its release position.

The device E further comprises a blocking spring 13 that urges the pin 6 toward its blocking position.

According to this architecture, when the electromagnet 8 is not activated (i.e., when the coil 10 is not supplied with power), and the pull member 3 is in its retracted position, the pin 6 is by default in its blocking position under the effect of the urging of the blocking spring 13.

The control unit 12 is adapted to control the electromagnet 8 in a first mode, called "unblocking" mode, in which the coil 10 is supplied, in the present example, with a direct current so as to attract the core 11 upward (in the position schematically shown in FIG. 2), thus controlling the transition of the pin 6 from its blocking position to its release position.

In FIG. 1, the sensor C and the emergency access device E are disposed in the handle P, with the end of the pull member 3 projecting from the outer surface of the handle P so that it can be manipulated by being pressed by the user.

According to the invention, the control unit 12 and the control means 20 are connected together in order to communicate with each other, and can be located, for example, on the printed circuit 30.

According to the invention, the control unit 12 is also adapted to control the electromagnet 8 in a second mode, called "vibration" mode, in which the electromagnet 8 oscillates the retention pin 6 between its blocking position and an intermediate position, which is located between the blocking position and the release position.

According to the invention, the unlocking/locking device D also comprises a chain 100 for transferring vibrations from the emergency access device E (see FIG. 3) to the bearing and/or contact surface S1 of the user on the handle P.

The vibration transfer chain 100 is made up of, for example, one or more interconnected metal parts, the stiffness of which allows vibrations to be transferred from the electromagnet 8 to the bearing and/or contact surface S1.

The transfer chain 100 can directly connect the electromagnet 8 to the bearing surface S1, or it can connect the pin 6 or the body 1 of the pull member 3 to the bearing surface S1.

The vibration transfer chain 100 mechanically connects the vibrating electromagnet 8 to the bearing surface S1. The transfer chain 100 can connect the pin 6, which is vibrated by the electromagnet 8, to the bearing surface S1 or even the body 1 of the pull member 3 to the bearing surface S1.

Indeed, when the electromagnet 8 oscillates the pin 6, with the pin 6 being in contact with the pull member 3 in the vicinity of the groove 7, the pin also vibrates the pull member 3. The pull member 3 for its part is located in a narrow recess 2 of the body 1, the recess 2 can comprise seals 14, for example, or may not comprise seals, but may be narrow enough to prevent the entry of any foreign material. The vibrating pull member 3 then causes the body 1 of the pull member 3 located around the pull member 3 to vibrate. By mechanically connecting the body 1 of the pull member to the bearing surface S1 via a transfer chain 100 comprising one or more metal part(s), the bearing surface S1 will also start to vibrate. A person skilled in the art knows how to design a chain for transferring vibrations from a vibrating element, i.e., the electromagnet 8, to a remote surface.

The device D also comprises means M1 for activating the electromagnet 8 in vibration mode as a function of information received from the means 20 for controlling the capacitive sensor C. Said information relates to the authentication status of the portable equipment SD of the user, in this case, successful authentication or failed authentication. This will be described hereafter.

The activation means M1 can be included, for example, and in a non-limiting manner, in the control unit 12 of the emergency access device, or in the BCM, or even in the control means 20.

In FIGS. 1, 2, 3, 5a, 5b, 5c, the activation means M1 are integrated in the control unit 12.

Indeed, as previously mentioned, the unlocking/locking device of the prior art does not allow the user to know whether the authentication has succeeded or failed. In the event of failed authentication, the user is therefore faced with a door that does not open, without knowing the reason.

The device according to the invention therefore allows two problems to be addressed, a problem of emergency access, when the electrical link with the lock has been interrupted, and a problem of lack of haptic feedback depending on the authentication state, successful or failed.

In order to generate this vibration, the control unit 12, in its vibration mode, powers the coil 10 in order to cause a slight upward movement (in the orientation example of FIG. 1) so that the end of the pin 6 slides upward against the shoulder 16 of the groove 7, but without reaching the edge 17, i.e., remaining below the point where the end of the pin 6 releases the pull member 3 by pulling out of the groove 7. This vibration of the pull member 3 is indeed caused while the pull member 3 is kept in its retracted position. The coil 10 will therefore be set into oscillation, for example, by a squarewave signal or a sinusoidal signal. This control is calibrated for an amplitude of movement of the pin 6 that does not exceed the depth of the groove 7 (the distance between the edge 17 and the bottom of the groove 7), so as not to trigger the device by transitioning the pull member 3 to its deployed position.

Controlling the unit 12 in vibration mode thus involves powering the coil 10 in order to cause this movement of the pin 6 without releasing the pull member 3, then in stopping the supply of power to the coil 10, so that, at least under the urging of the locking spring 13, the pin 6 returns to its blocking position by striking the bottom of the groove 7 of the pull member 3.

This vibration sequence, depending on the oscillation frequency of the pin 6, causes the desired vibration of the pull member 3.

Preferably, the vibration mode control unit is calibrated for a vibration frequency of the pin 6 on the pull member 3 in a preferred range of 5 to 50 kHz. Preferably, this frequency is from 10 to 20 kHz, which allows vibration that is inaudible to the human ear.

According to one embodiment, this frequency is selected to correspond to the resonant frequency of the pull member 3 so that the vibration movements of the pull member 3 are amplified. This resonant frequency is a feature linked to the construction of the pull member and of the elements with which it is in contact. This resonant frequency is easily determined empirically or by computation.

According to another embodiment, the vibration frequency is variable over a predetermined frequency range such that the vibration of the device will necessarily pass through one or more resonant frequencies of its constituent elements, even if this resonant frequency is not determined in advance.

Alternative embodiments of the emergency access device can be implemented without departing from the scope of the invention. In particular, the electric ejector can be formed by an actuator using different technology, for example, by a piezoelectric actuator or by a rotary or linear electric motor, or any other actuator that can be controlled by the control unit 12 in a vibration mode.

The unlocking/locking method will now be described with reference to FIGS. 4 and 5.

In an initial step E0, the device D is at rest. This is shown in FIG. 5a.

In a first step, E1, the approach and/or contact of the hand of the user in the predetermined zone Z is detected by means of the capacitive sensor C and the control means 20 send a detection signal to the electronic unit 40. This is shown in FIG. 5b.

Then, in step E2, the antenna A sends an authentication request signal to the portable equipment SD of the user, namely a fob or remote control (or smart phone) carried by the user, and the transmission/reception means 50 notify the electronic unit 40 of the authentication status, this is shown in FIG. 5b.

In step E3, if the authentication is successful, then in step E4a, the electronic unit 40 sends a request to activate the vibration mode of the electromagnet 8 to the activation means M1. The electromagnet 8 then starts to vibrate, with a vibration pattern of the "successful authentication" type (for example, a single vibration) and transfers this vibration VB via the transfer chain 100 to the contact surface S1. By the user simply touching their hand on the surface S1, the user therefore feels a vibration, which notifies them that the authentication has been successful and that the door will unlock. This is shown in FIG. 5c.

If the authentication failed, then, in step E4b, the electronic unit 40 sends a request to activate the vibration mode of the electromagnet 8 to the activation means M1. The electromagnet 8 then starts to vibrate, with a vibration pattern of the "failed authentication" type (for example, two vibrations) and transfers this vibration VB via the transfer chain 100 to the contact surface S1. By the user simply touching their hand on the surface S1, the user therefore feels a vibration, which notifies them that the authentication has failed and that the door will not unlock. This is shown in FIG. 5c.

The vibration pattern for a successful authentication or for a failed authentication can clearly differ from those cited by way of an example, as long as they are distinctive to the user so that they can distinguish a successful authentication from a failed authentication.

The invention thus ingeniously allows the problems of the prior art to be addressed. The unlocking/locking device according to the invention not only allows emergency access to the vehicle in the event of an accident, but also sensitive feedback during nominal operation of the door handle, which allows the user to be notified of the status of the authentication.

By virtue of a synergy between the various elements of the device, antenna, reception/transmission means, electronic unit, capacitive sensor and emergency access device, these two functions can be fulfilled. The emergency device therefore not only functions in its primary function, i.e., to allow emergency access, but also proposes a second, non-obvious function that notifies the user of the authentication status of their portable equipment when they intend to unlock the door.

The invention claimed is:

1. A device for "hands-free" unlocking/locking of a door of a motor vehicle, said device being intended to be placed on board said vehicle, and comprising a radiofrequency antenna and radiofrequency transmission/reception means capable of authenticating portable equipment of a user, at least one capacitive sensor for detecting the approach and/or the contact of a member of the user in a predetermined zone, an electronic unit controlling the unlocking of the door, said device including an emergency access device comprising:
   a) a body;
   b) a graspable pull member connected to a lock actuator and movable between: a retracted position, in which the pull member is retracted in the body; and a deployed position, in which the pull member projects outside the body;
   c) a retention pin sliding transverse to the pull member and adapted to assume: a blocking position, in which the retention pin is disposed against the pull member, keeping the pull member in the retracted position, and a position for releasing the pull member;
   d) an electric ejector adapted to control the sliding of the retention pin;
   e) a control unit for the electric ejector adapted to control the electric ejector in two modes: an unblocking mode, in which the electric ejector drives the retention pin from the blocking position to the release position; and a vibration mode, in which the electric ejector oscillates the retention pin between is the electric elector's blocking position and an intermediate position between the blocking position and the release position,
the control unit controlling the electric ejector in vibration mode as a function of an authentication status of the equipment of the user, the device comprising a chain for transferring vibrations between the electric ejector and a contact surface of the member of the user, in order to notify the user of the authentication status.

2. The device as claimed in claim 1, wherein the retention pin comprises a ferromagnetic core, and is wherein the electric ejector is an electromagnet comprising:
  a) a magnetic circuit surrounding the ferromagnetic core of the retention pin;
  b) a coil adapted to magnetize the magnetic circuit and attract the ferromagnetic core of the retention pin.

3. The device as claimed in claim 2, further comprising a blocking spring urging the retention pin toward the blocking position.

4. The device as claimed in claim 2, further comprising an ejection spring urging the pull member toward the deployed position.

5. A door handle of a motor vehicle, comprising the device of claim 2.

6. A motor vehicle, comprising the device of claim 2.

7. A method for "hands-free" unlocking of a door of a motor vehicle by a device as claimed in claim 2, the method comprising:
  a) detecting the approach and/or the contact of the hand of the user in the predetermined zone;
  b) requesting authentication sent to the portable equipment of the user;
  c) activating the vibration mode of the electromagnet, with a vibration pattern that is dependent on the authentication status.

8. The device as claimed in claim 1, further comprising a blocking spring urging the retention pin toward the blocking position.

9. The device as claimed in claim 8, further comprising an ejection spring urging the pull member toward the deployed position.

10. A door handle of a motor vehicle, comprising the device of claim 8.

11. A motor vehicle, comprising the device of claim 8.

12. The device as claimed in claim 1, further comprising an ejection spring urging the pull member toward the deployed position.

13. A door handle of a motor vehicle, comprising the device of claim 12.

14. A motor vehicle, comprising the device of claim 12.

15. A door handle of a motor vehicle, comprising a device as claimed in claim 1.

16. A motor vehicle, comprising a device as claimed in claim 1.

17. A method for "hands-free" unlocking of a door of a motor vehicle by a device as claimed in claim 1, the method comprising:
  a) detecting the approach and/or the contact of the hand of the user in the predetermined zone;
  b) requesting authentication sent to the portable equipment;
  c) activating the vibration mode of the electromagnet, with a vibration pattern that is dependent on the authentication status.

18. The method as claimed in claim 17, wherein the oscillation frequency of the retention pin in the vibration mode is in the range of 5 to 50 KHz.

19. The method as claimed in claim 17, wherein the oscillation frequency of the retention pin in vibration mode is substantially equal to the resonant frequency of the pull member.

20. The method as claimed in claim 17, wherein the oscillation frequency of the retention pin in vibration mode is a frequency having a regular variation in a predetermined frequency range.

* * * * *